United States Patent
Song et al.

(10) Patent No.: US 11,379,554 B2
(45) Date of Patent: Jul. 5, 2022

(54) VERIFICATION METHOD AND SYSTEM FOR OPERATION RESULT BASED ON RECONFIGURABLE BUTTERFLY UNIT

(71) Applicant: HeFei University of Technology, Anhui (CN)

(72) Inventors: Yukun Song, Anhui (CN); Zhengmao Wang, Anhui (CN); Duoli Zhang, Anhui (CN); Xu Tang, Anhui (CN); Zhenmin Li, Anhui (CN); Gaoming Du, Anhui (CN)

(73) Assignee: HEFEI UNIVERSITY OF TECHNOLOGY, Anhui (CN)

( * ) Notice: Subject to any disclaimer, the term of this patent is extended or adjusted under 35 U.S.C. 154(b) by 38 days.

(21) Appl. No.: 17/172,810

(22) Filed: Feb. 10, 2021

(65) Prior Publication Data

US 2021/0334333 A1 Oct. 28, 2021

(30) Foreign Application Priority Data

Apr. 24, 2020 (CN) .......................... 202010332095.2

(51) Int. Cl.
*G06F 17/14* (2006.01)
(52) U.S. Cl.
CPC ................................. *G06F 17/141* (2013.01)
(58) Field of Classification Search
CPC ..................................................... G06F 17/141
USPC .......................................................... 708/409
See application file for complete search history.

(56) References Cited

U.S. PATENT DOCUMENTS

| 2011/0105148 A1* | 5/2011 | Russell | .............. | H04B 1/71637 |
| | | | | 375/135 |
| 2018/0294950 A1* | 10/2018 | Khedr | ...................... | G09C 1/00 |
| 2021/0327528 A1* | 10/2021 | Li | ...................... | G11C 29/1201 |

OTHER PUBLICATIONS

Han et at, "An Improved FFT Architecture Optimized for Reconfigurable Application Specified Processor", IEEE 2015, Total 4 pages.
Lin et al., "Cost-Effective Triple-Mode Reconfigurable Pipeline FFT/IFFT/2-D DCt Processor", IEEE Transactions on Very Large Scale Integration (VLSI) Systems, Aug. 2008, vol. 16, No. 8, pp. 1058-1071.
Zhizhe et al., "A Reconfigurable and High Precision VLSI Architecture for Fast Fourer Transform" IEEE 2010, vol. 4, pp. V4-420-V4-423.

* cited by examiner

*Primary Examiner* — Allen C Wong
(74) *Attorney, Agent, or Firm* — Birch, Stewart, Kolasch & Birch, LLP

(57) ABSTRACT

The present application discloses a verification system and method for an operation result based on a reconfigurable butterfly unit. The system is applicable to a digital signal processing (DSP) chip. The DSP chip includes a reconfigurable butterfly unit. The reconfigurable butterfly unit may be reconfigured into two modes: a first verification mode and a second verification mode. The system includes: a controller, a memory, a verification unit, a first data gating unit, and a second data gating unit. The technical solution in the present application is used to overcome the disadvantage that an existing verification system and an existing verification method consume large hardware resources, thereby reducing the implementation costs of operation result verification.

14 Claims, 2 Drawing Sheets

VERIFICATION METHOD AND SYSTEM FOR OPERATION RESULT BASED ON RECONFIGURABLE BUTTERFLY UNIT

RELATED APPLICATION

This application claims the priority of Chinese invention application No. 202010332095.2 filed on Apr. 24, 2020 under the title " Fast Verification Method and System for Operation Result Based on Reconfigurable Butterfly Unit".

FIELD OF THE INVENTION

The present application relates to the technical field of data operations, and specifically, to a fast verification system for an operation result based on a reconfigurable butterfly unit.

BACKGROUND

With the continuous development of technologies, transform methods such as discrete Fourier transform (DFT) and its inverse, and discrete cosine transform (DCT) and its inverse are gradually introduced to improve the efficiency of data operations.

During the performing of such algorithms, in order to ensure fast and accurate results, operation results need to be verified, especially real-time verified. For example, in the fields such as aerospace, due to the interference of intense radiations, chips are highly prone to inaccurate upsets to cause errors in operation results. Therefore, the results needs to be verified to ensure they are accurate.

In the prior art, in one aspect, a spatial modular redundancy manner is used, and the hardware is duplicated into two or more copies. Operations are performed simultaneously, operation results of the different copies of hardware are compared, and the accuracy of the operation results is verified. This verification manner causes massive hardware resource overheads.

In another aspect, one same piece of hardware is used to perform three operations, operation results of the three operations are compared, and the accuracy of the operation results is verified. This verification manner causes massive time overheads, massive hardware resources need to be consumed to compare the results of the operations one by one, and the hardware faults are not considered.

Therefore, existing methods of operation result verification have high implementation costs, requiring the sacrifice of massive hardware resources or time efficiency, and cannot satisfy the timeliness requirement in actual engineering applications.

SUMMARY

The aims of the present application are to overcome the disadvantage that an existing method consumes large hardware resources, thereby reducing the implementation costs of operation result verification. The technical solution in the present application is as follows: A fast verification system for an operation result based on a reconfigurable butterfly unit is provided. The system is applicable to a digital signal processing (DSP) chip that performs operations such as fast Fourier transform (FFT), inverse FFT (IFFT), DCT, and inverse DCT (IDCT). The DSP chip includes a reconfigurable butterfly unit. The reconfigurable butterfly unit is configured to perform transform of a target operation according to input data to obtain corresponding output data. The input data and the output data are both arrays.

The reconfigurable architechture has already be used in the art, such as, referring to "A Reconfigurable and High Precision VLSI Architecture for Fast Fourier Transform" published in 2010, V4-422 of "International Conference on Computer Engineering and Technology" and "Cost-Effective Triple-Mode Reconfigurable Pipeline FFT IFFT 2D DCT Prcocessor" published on IEEE Transactions on very large scale integration(VlsI) systems, Vol. 16, NO. 8, Aug. 2008.

Specifically, in one aspect, the application provides a verification system for an operation result based on a reconfigurable butterfly unit, the system comprising: a controller, a memory, a verification unit, a first data gating unit, and a second data gating unit, the system being configured to perform data verification on a digital signal processing (DSP) chip, the DSP chip comprising a reconfigurable butterfly unit, wherein the reconfigurable butterfly unit has a normal butterfly operation mode and is capable of being reconfigured into two modes: a first verification mode and a second verification mode;

an input port of the first data gating unit is connected to an input port of the DSP chip to receive input data the same as that received by the DSP chip, and the first data gating unit is configured to separately input the input data into the memory and the reconfigurable butterfly unit based on an instruction of the controller;

a first input port of the second data gating unit is configured to receive target data output by the first data gating unit, a second input port of the second data gating unit is configured to receive data from the memory, and is configured to output the data came from the first input port or the second input port to the reconfigurable butterfly unit according to the instruction of the controller;

the controller acquires status information of the DSP chip, and is configured to transmit a reconfiguration operation instruction to the reconfigurable butterfly unit, so that: when the DSP chip is in a data reception phase, controlling the reconfigurable butterfly unit to be reconfigured into the first verification mode, to calculate a first verification value based on the input data of the DSP chip; and when the DSP chip is in a data transmission phase, controlling the reconfigurable butterfly unit to be reconfigured into the second verification mode, to calculate a second verification value based on output data of the DSP chip, wherein otherwise, the reconfigurable butterfly unit is in the normal butterfly operation mode; and the verification unit is connected to an output port of the reconfigurable butterfly unit, and the verification unit is configured to: calculate the product of multiplying the first verification value by a predetermined coefficient, calculate a difference value between the product and the second verification value, determine whether the difference value is less than or equal to a verification threshold, and if yes, determine that the output data is accurate.

Preferably, the input data and the output data are both arrays.

Preferably, when the DSP chip is in the data reception phase, the reconfigurable butterfly unit is reconfigured into a first square sum calculation unit, to: calculate a square sum of the input data, label the calculated square sum as the first verification value, and transmit the first verification value to the verification unit for temporary storage.

Preferably, when the DSP chip is in the data transmission phase, the reconfigurable butterfly unit is reconfigured into a second square sum calculation unit, to: calculate a square sum of the output data, label the calculated square sum as the second verification value, and transmit the second verification value to the verification unit.

Preferably, the first square sum calculation unit comprises a plurality of square units and accumulate units, and the second square sum calculation unit have the same structure as the first square sum calculation unit.

Preferably, when the reconfigurable butterfly unit performs a discrete Fourier transform (DFT) operation and an inverse DFT (IDFT) operation, the square unit comprises: first multipliers, second multipliers, and adders;

the first multipliers are configured to calculate the squares of the real parts of each input data;

the second multipliers are configured to calculate the squares of the imaginary parts of each input data; and the adders are configured to: calculate a sum value of the squares of the real parts and the squares of the imaginary parts, and label the sum value as an output of the square unit.

Preferably, when the reconfigurable butterfly unit performs a discrete Fourier transform (DFT) operation and an inverse DFT (IDFT) operation, the predetermined coefficient is a score, and the score is determined by a quantity of pieces of data required when the reconfigurable butterfly unit performs one operation.

Preferably, a transformation matrix of the input data satisfies a calculation formula:

$$W \cdot W^T = kE,$$

in the formula, W is the transformation matrix of the input data, E is an identity matrix, and k is a constant.

In another aspect, the application provides, a verification method for an operation result based on a reconfigurable butterfly unit, the method being used for performing data verification on a digital signal processing (DSP) chip, the DSP chip comprising a reconfigurable butterfly unit, wherein the reconfigurable butterfly unit has a normal butterfly mode and is capable of being reconfigured into two modes: a first verification mode and a second verification mode, and the method comprises:

receiving and storing an input in the input data of the DSP chip;

acquiring status information of the DSP chip;

sending a reconfiguration operation instruction to the reconfigurable butterfly unit, so that: when the DSP chip is in a data reception phase, control the reconfigurable butterfly unit to be reconfigured into the first verification mode, to calculate a first verification value based on the input data of the DSP chip, and when the DSP chip is in a data transmission phase, control the reconfigurable butterfly unit to be reconfigured into the second verification mode, to calculate a second verification value based on output data of the DSP chip, otherwise, the reconfigurable butterfly unit does not perform reconfiguration; and calculating the product of multiplying the first verification value by a predetermined coefficient, calculating a difference value between the product and the second verification value, determining whether the difference value is less than or equal to a verification threshold, and if yes, determining that the output data is accurate.

Technical Effects:

In the present invention, a reconfiguration capability of a reconfigurable butterfly unit is used, and a verification system is built on an existing DSP chip only by adding a data selection/gating unit (a multiplexer (MUX)) and a verification unit (which performs simple multiplication and comparison operations). In a data reception phase and a data transmission phase, that is, the reconfigurable butterfly unit is reconfigured in an idle phase of the reconfigurable butterfly unit, to calculate a corresponding first verification value and a corresponding second verification value. The verification unit then calculates the product of multiplying the first verification value by a predetermined coefficient, and determines whether a difference value between the product and the second verification value is less than or equal to a verification threshold, to implement the verification of output data. Thus, in one aspect, hardware resources in an existing DSP chip are fully used, and the consumption of hardware resources during data verification is reduced. In another aspect, an idle phase of the reconfigurable butterfly unit is used, time overheads during verification are reduced, and the timeliness requirement of the verification system in actual engineering applications can be satisfied.

The fast verification system in the present application has a wide application range, covering various reconfigurable butterfly unit structures of common operation transform such as DFT, inverse DFT (IDFT), DCT, and IDCT. The operation speed is high, so that a real-time requirement can be satisfied, and resource consumption is relatively low, so that resources are saved.

The verification system in the present application transforms a score during verification into a predetermined coefficient and performs a multiplication operation, so that the verification system does not require an operation score and is applicable to the verification of a reconfigurable butterfly unit with any score, especially, a reconfigurable butterfly unit with a high score, and has an especially significant advantage of reducing resource consumption.

BRIEF DESCRIPTION OF DRAWINGS

The advantages in the foregoing and/or additional aspects of the present application will become apparent and more comprehensible from the following description of the embodiments with reference to the accompanying drawings.

DETAILED DESCRIPTION OF EMBODIMENTS

Figure 1:
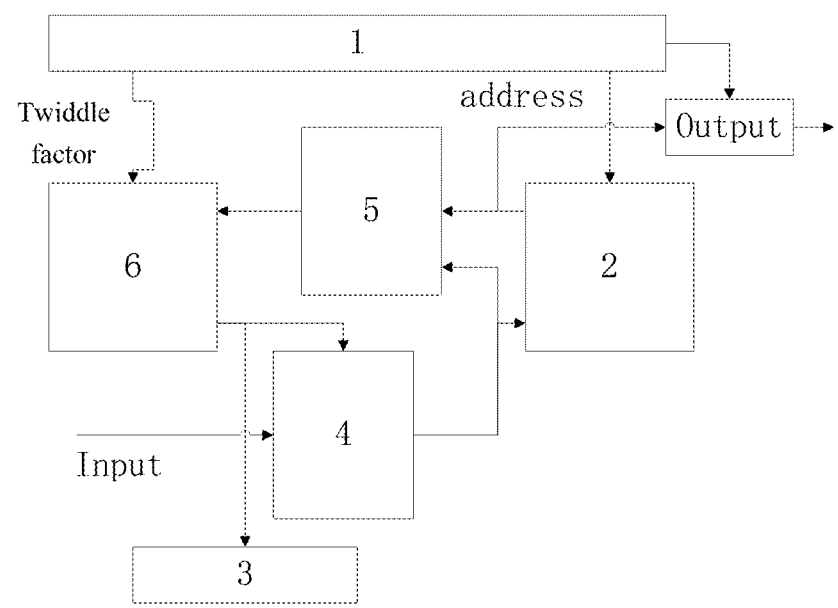
FIG. 1 is a schematic block diagram of a fast verification system for an operation result based on a reconfigurable butterfly unit according to an embodiment of the present application.

To make the objectives, features, and advantages of the present application more comprehensible, the present application is further described below in detail with reference to the accompanying drawings and specific implementations.

During an existed butterfly unit performing data operation, a calculation procedure of the butterfly unit may include three phases: a data reception phase, a data operation phase, and a data transmission phase.

In the data reception phase, a data gating unit gates an input port of a DSP chip to a memory. Input data (source data) of the DSP chip is used as written data of the memory. A controller generates an address for the written data and temporarily stores the input data of the DSP chip in the memory.

In the data operation phase, the controller generates a twiddle factor as a parameter of the butterfly unit, and reads data from the memory. The butterfly unit performs the target operation to obtain a corresponding calculation result, and then writes the calculation result into the memory according to the address generated by the controller. It may be necessary to repeat the foregoing process several times, which is determined by a quantity of levels of the target operation (or target transform).

In the data transmission phase, the controller reads the calculation result from the memory according to the address and outputs the calculation result to an output port of the DSP chip.

Those skilled in the art should understand that, the process of determination of the phases of current, the manner of generating an address in the memory, a calculation process of the butterfly unit, and the like belong to the prior art.

This embodiment provides a fast verification system for an operation result based on a reconfigurable butterfly unit. The system is applicable to a DSP chip. The DSP chip includes a reconfigurable butterfly unit. The reconfigurable butterfly unit is configured to perform the target operation/transform according to input data to obtain corresponding output data. The input data and the output data are both arrays. The target operation may include a DCT operation, an IDCT operation, a DFT operation, an IDFT operation, and the like.

Specifically, in this embodiment, it is set that a transformation matrix W of the input data satisfies the following formula:

$$W \cdot W^T = kE,$$

wherein in the formula, W is the transformation matrix of the input data, E is an identity/unitary matrix, and k is a constant.

For ease of description, it is set that the input data in this embodiment is an array formed by real numbers, and the reconfigurable butterfly unit performs a DCT operation.

Based on an existing DSP chip, a reconfigurable butterfly unit is used to replace the butterfly unit. The reconfigurable butterfly unit is reconfigured, and a data gating unit (a MUX) and a verification unit are added, so as to calculate verification values of input data and output data, to implement the verification of the accuracy of the output data of the DSP chip.

As shown in FIG. 1, the verification system includes a controller 1, a memory 2, a verification unit 3, a first data gating unit 4, a second data gating unit 5 and reconfigurable butterfly unit 6.

An input port of the first data gating unit 4 is connected to the input port of the DSP chip and an output port of the reconfigurable butterfly unit. An output port of the first data gating unit 4 is connected to an input port of the memory 2 and a first input port of the second data gating unit 5. A second input port of the second data gating unit 5 is further connected to an output port of the memory 2. An output port of the second data gating unit 5 is connected to an input port of the reconfigurable butterfly unit.

Specifically, after a detail analysis of the calculation procedure, the inventor found that in the data reception phase and the data transmission phase, the butterfly unit does not participate in data operations. That is, the internal operator of the butterfly unit is in an idle state. Therefore, the butterfly unit is replaced with a reconfigurable butterfly unit, and a first verification value corresponding to the input data is calculated in the data reception phase, and a second verification value of the output data is calculated in the data transmission phase.

The controller 1 uses a conventional gating instruction to control the first data gating unit 4 and the second data gating unit 5 to perform selective connection, to implement the control of data streams in the data reception phase and the data transmission phase.

In the data reception phase, the controller 1 adjusts a gating state (a first gating state) of the second data gating unit 5, so that one copy of input data received by the first data gating unit 4 is stored in the memory 2, and the other copy of the data is transmitted to the reconfigurable butterfly unit and used for calculating the first verification value of the input data.

Similarly, in the data transmission phase, the output data temporarily stored in the memory 2 is transmitted to the reconfigurable butterfly unit through the second data gating unit 5 (a second gating state), and is used for calculating the second verification value of the output data.

Finally, the verification unit 3 completes verification. By using such a verification system as above, in one aspect, the resource utilization of existing resources in the DSP chip can be improved, and hardware resource overheads during data verification are reduced, and in another aspect, while the output data is transmitted, the verification of the output data is completed, thereby improving the timeliness of data verification.

During the calculation of the first verification value and the second verification value in this embodiment, the controller 1 is configured to transmit a reconfiguration operation instruction to the reconfigurable butterfly unit. The reconfiguration operation instruction is configured to control the reconfigurable butterfly unit to perform reconfiguration and perform data operation. The reconfigurable butterfly unit is further configured to calculate the first verification value of the input data and the second verification value of the output data according to the reconfiguration operation instruction.

Further, when it is determined, for example by the controller, that the DSP chip is in the data reception phase, the reconfiguration operation instruction adopts a first instruction, and the controller 1 is further configured to transmit a first gating instruction to the second data gating unit 5. The first gating instruction is used for setting the second data gating unit 5 to the first gating state, to enable the reconfigurable butterfly unit to acquire the input data stored in the memory 2 by the first data gating unit 4.

When the first gating instruction is received, the reconfigurable butterfly unit is configured to be reconfigured into a first square sum calculation unit, to calculate a square sum of the input data, label the calculated square sum as the first verification value, and transmit the first verification value to the verification unit 3 for temporary storage.

Specifically, in this case, the second data gating unit 5 is in the first gating state. While the input data is stored in the memory 2, the input data is transmitted to the reconfigurable butterfly unit reconfigured into the first square sum calculation unit. The first square sum calculation unit calculates the square sum of the input data, and label the square sum as the first verification value.

In the reconfigurable butterfly unit in this embodiment, based on an existing butterfly unit, no additional multiplier and adder are added, and it is only necessary to add several multiplexers (MUXs).

Figure 2:
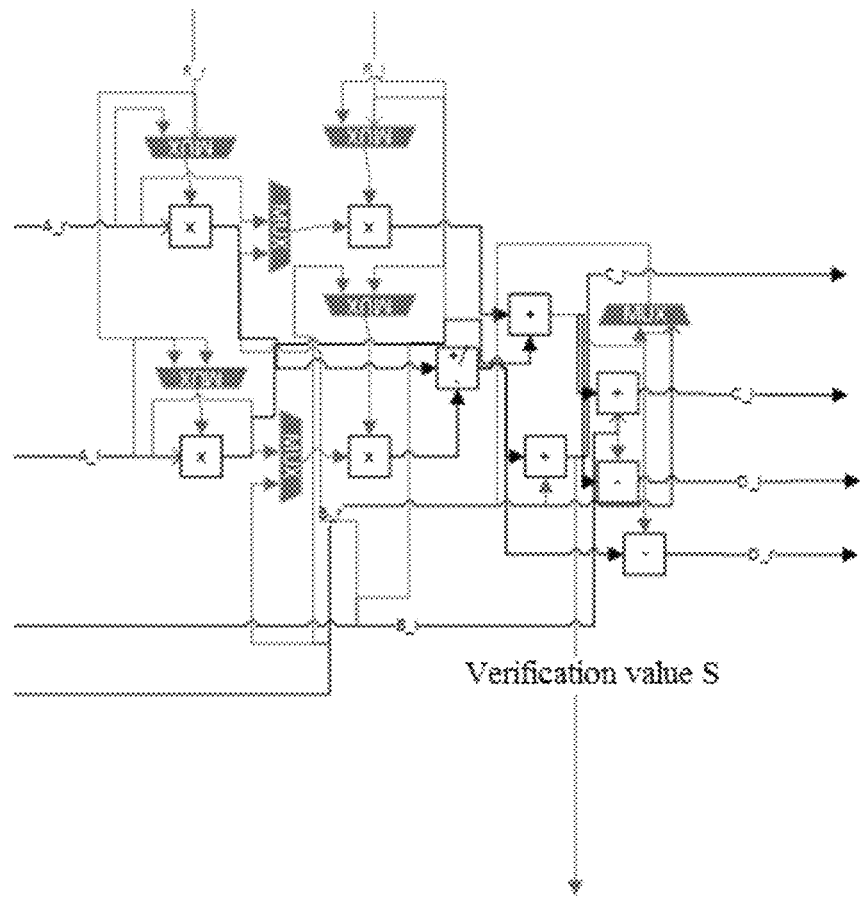
FIG. 2 is a schematic block diagram of a reconfigurable butterfly unit according to an embodiment of the present application.

For the reconfiguration of a reconfigurable butterfly unit, taking a parallel structure for performing FFT butterfly as an example, an input of the reconfigurable butterfly unit includes two copies of input data and one twiddle factor, as shown in FIG. 2. The added MUXs are used for path selection to build a square unit(s) and an accumulate unit(s) required during verification, to calculate a square sum of the input data or a square sum of output data.

Now, it is set that the input data and the output data of the butterfly unit are all complex numbers. Therefore, data used in a calculation process may be represented as follows: the real part of the twiddle factor is R_r, the imaginary part of the twiddle factor is R_i, the real part of the input data is A_r, the imaginary part of the input data is A_i, the real part of first output data is C_r, the imaginary part of the first output data is C_i, the real part of second output data is D_r, the imaginary part of the second output data is D the real part of a middle operand is B_r, and the imaginary part of the middle operand is B_i.

When the reconfiguration operation instruction received by the reconfigurable FFT butterfly unit is the first instruction, that is, in the data reception phase, the butterfly unit is reconfigured into the first square sum calculation unit. Through path selection, the reconfigured first square sum calculation unit includes four multipliers and three adders. The four multipliers are respectively configured to calculate the squares of the real parts and the imaginary parts of the two pieces of input data, to obtain four square numbers. The three adders are then used to perform accumulate operations on the four square numbers, and an accumulated sum value is the first verification value. A calculation formula of the first verification value S is:

$$S=\Sigma(A\_r)^2+(A\_i)^2+(B\_r)^2+(B\_i)^2.$$

When the reconfiguration operation instruction received by the reconfigurable FFT butterfly unit is a conventional operation instruction, that is, in the data operation phase, the butterfly unit is reconfigured into a calculation unit that performs the the target operation/transform, to perform a conventional operation, wherein a calculation formula of corresponding output data is:

$$C=B+AR, \text{ and}$$

$$D=B-AR.$$

The input data is sequentially inputted into the first square sum calculation unit according to an arrangement order in the array. It is set that the $i^{th}$ data is $x_i$. A square value of the data $x_i$ is calculated by using the square unit reconfigured in the first square sum calculation unit. In this case, the square unit may be a multiplier that performs a square operation. An accumulate operation is then performed on the square value of the data $x_i$ by using the accumulate unit reconfigured in the first square sum calculation unit. The result is labeled as the first verification value, and the first verification value is transmitted to the verification unit 3 for temporary storage.

In the data operation phase, the reconfiguration operation instruction is a conventional operation instruction. Under the control of the controller 1, the reconfigurable butterfly unit is reconfigured into the calculation unit that performs the transform of the target operation, to calculate output data corresponding to the input data. This process is not described in detail again.

Further, when the DSP chip is in the data transmission phase, the reconfiguration operation instruction is a second instruction. At this time, the controller 1 is configured to transmit a second gating instruction to the second data gating unit 5. The second gating instruction is used for setting the second data gating unit 5 to be the second gating state, to enable the reconfigurable butterfly unit to acquire output data in the memory 2. When the second instruction is received, the reconfigurable butterfly unit is further configured to be reconfigured into a second square sum calculation unit, to calculate a square sum of the output data, label the calculated square sum as the second verification value, and transmit the second verification value to the verification unit 3. The first square sum calculation unit includes the square unit and an accumulate unit that are connected. The second square sum calculation unit and the first square sum calculation unit have the same structure.

Specifically, in this case, the second data gating unit 5 is in the second gating state. While the output data temporarily stored in the memory 2 is transmitted to the output port, the output data is transmitted to the reconfigurable butterfly unit, which is reconfigured into the second square sum calculation unit. The second square sum calculation unit calculates a square sum of the output data, and labels the square sum as the second verification value.

The process of reconfiguring the reconfigurable butterfly unit into the second square sum calculation unit is the same as the foregoing process of reconfiguring the reconfigurable butterfly unit into the first square sum calculation unit. Details are not described in detail again.

The verification unit 3 is connected to the output port of the reconfigurable butterfly unit. The verification unit 3 is configured to: calculate the product of multiplying the first verification value by a predetermined coefficient, determine whether a difference value between the product and the second verification value between is less than or equal to a verification threshold, and if yes, determine that the output data is accurate.

Specifically, the verification threshold is set in consideration of a calculation error that occurs when the reconfigurable butterfly unit performs a DCT operation.

When determining the verification threshold, a reconfigurable butterfly unit with the same structure may be used in advance to perform a plurality of operations. Errors in difference values calculated by the verification unit are statistically collected, and the largest error is appropriately increased by a particular proportion for use as the verification threshold during actual verification.

In the system, the predetermined coefficient is determined by the transformation matrix of the input data and is a score during an operation. That is, the score is a constant k in the equation $W \cdot W^T = kE$.

Therefore, for a DFT operation and an IDFT operation, the predetermined coefficient is a constant k that satisfies the equation $W \cdot W^T = kE$. For a DCT operation and an IDCT operation, the predetermined coefficient is 1.

The verification unit 3 calculates the product of multiplying the temporarily stored first verification value by the predetermined coefficient, performs a subtraction operation on the product and the second verification value to obtain a corresponding difference value, and compares the difference value with the verification threshold, to determine whether the output data is accurate. That is, when the difference value is less than or equal to the verification threshold, the output data accurate, or otherwise, the output data is inaccurate.

Figure 3:
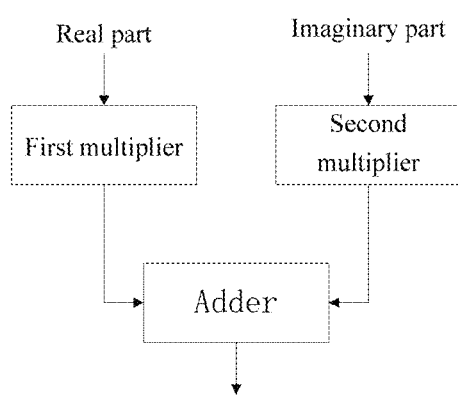
FIG. 3 is a schematic block diagram of a square unit according to an embodiment of the present application.

Further, as shown in FIG. 3, when the reconfigurable butterfly unit performs a DFT operation and an IDFT operation, the input data includes two parts, i.e., the real part and the imaginary part. In this case, the square unit in the first (or second) square sum calculation unit reconfigured from the reconfigurable butterfly unit includes: a first multiplier(s), a second multiplier(s), and an adder(s). The first multiplier is configured to calculate the square of the real part of the input data of the square unit. The second multiplier is configured to calculate the square of the imaginary part of the input data of the square unit. The adder is configured to: calculate a sum value of the square of the real part and the square of the imaginary part, and label the sum value as an output of the square unit.

Specifically, during a complex number operation, the reconfigured square unit includes two multipliers and one adder. The two multipliers respectively perform square operations on the real part and the imaginary part, and then add the results of the square operations of the two parts by using the adder, to implement an operation of a conjugate square of a complex number. Details of a specific operation process are not described in detail again.

Further, when the reconfigurable butterfly unit performs a DFT operation and an IDFT operation, the predetermined coefficient is a score. The score is determined by a quantity of of data required when the reconfigurable butterfly unit performs one operation, that is, a constant k in the equation $W \cdot W^T = kE$.

To validate the accuracy of the verification process in the foregoing embodiments, a DFT algorithm is used as an example to perform the following theoretical derivation:

It is set that x(n) is source data, and a sequence X(k) obtained after the DFT performed on the source data is:

$$X(k) = \sum_{n=0}^{N-1} x(n) * e^{-j\frac{2\pi}{N}nk}.$$

According to its inverse, it may be obtained that:

$$x(k) = \frac{1}{N} \sum_{n=0}^{N-1} X(n) * e^{j\frac{2\pi}{N}nk}.$$

In the formula, n=0,1, . . . , N −1, k is the number of the sequence, k=0,1, . . . N−1, and N is a quantity of the input data.

According to the definition of DFT, the input data is decomposed into a linear representation with $\varphi_k(n)$ representing the basis and the output data X(k) representing a coordinate, that is:

$$N * x(n) = (\varphi_0(n), \varphi_1(n), \ldots, \varphi_{N-1}(n)) \begin{pmatrix} X(0) \\ X(1) \\ \vdots \\ X(N-1) \end{pmatrix}.$$

A calculation formula of the basis $\varphi_k(n)$ is:

$$\varphi_k(n) = e^{-j\frac{2\pi}{N}nk}.$$

An inner product is defined as follows:

$(f(n)*g(n))=\Sigma_{i=0}^{N-1}f(i)* \overline{g(i)}$ wherein $\overline{g(i)}$ is a conjugate of g(i).
Therefore, it may be obtained that:

$(\varphi_i(n), \varphi_i(n))=N$, and $(\varphi_i(n), \varphi_j(n))=0, i \neq j,$ wherein $(\varphi_0(n), \varphi_1(n), \ldots, \varphi_{N-1}(n))$ is a orthogonal basis of the inner product space, and the square of the modulus is equal to N, that is:

$(N*x(n), N*x(n))=(X(k), X(k))*N.$

In summary, it may be obtained that:

$N*\Sigma_{n=0}^{N-1}x(n)* \overline{x(n)} =\Sigma_{k=0}^{N-1}X(k)* \overline{X(k)}$ That is, due to an error that occurs in a DFT operation, if a difference value between the product of multiplying a conjugate square sum (the first verification value) of the input data by a fixed predetermined coefficient N and a conjugate square sum (the second verification value) of the output data is within a particular range (is less than or equal to the verification threshold), it may be determined that the result of the DFT operation is accurate. A person skilled in the art may understand that because a real number may be considered as a special complex number with an imaginary part of 0, the foregoing validation process is also applicable to a DCT operation. Details are not described again.

To validate the accuracy of the verification system in the foregoing embodiments, one double-precision floating-point FFT operator is used as an example to perform a DFT operation on the input data being a sequence "0:1023" with a quantity of 1024. The conjugate squares of the input data are calculated and accumulated, to obtain a result of 357389824. The result is then multiplied by the predetermined coefficient (score) of 1024, to obtain a first validate value of 3.6597e+11.

The reconfigurable butterfly unit obtains output data after performing operations for a particular time, and performs operations on the output data to calculate conjugate squares and accumulate the conjugate squares, to obtain the second verification value of 3.6597e+11.

The two validate values are compared. The difference value is 0 and is within an allowable error range. Therefore, it may be determined that an operation result of the input data "0:1023" by the double-precision floating-point FFT operator is accurate.

According to an actual requirement, the steps in the present application may be rearranged, combined or deleted.

According to an actual requirement, the units of the apparatus in the present application may be combined, divided or deleted.

The invention claimed is:

1. A verification system for an operation result based on a reconfigurable butterfly unit, the system comprising: a controller, a memory, a verification unit, a first data gating unit, and a second data gating unit, the system being configured to perform data verification on a digital signal processing (DSP) chip, the DSP chip comprising a reconfigurable butterfly unit, wherein the reconfigurable butterfly unit has a normal butterfly operation mode and is capable of being reconfigured into two modes: a first verification mode and a second verification mode;

an input port of the first data gating unit is connected to an input port of the DSP chip to receive input data the same as that received by the DSP chip, and the first data gating unit is configured to separately input the input data into the memory and the reconfigurable butterfly unit based on an instruction of the controller;

a first input port of the second data gating unit is configured to receive target data output by the first data gating unit, a second input port of the second data gating unit is configured to receive data from the memory, and is configured to output the data came from the first input port or the second input port to the reconfigurable butterfly unit according to the instruction of the controller;

the controller acquires status information of the DSP chip, and is configured to transmit a reconfiguration operation instruction to the reconfigurable butterfly unit, so that: when the DSP chip is in a data reception phase, controlling the reconfigurable butterfly unit to be reconfigured into the first verification mode, to calculate a first verification value based on the input data of the DSP chip; and when the DSP chip is in a data transmission phase, controlling the reconfigurable butterfly unit to be reconfigured into the second verification mode, to calculate a second verification value based on output data of the DSP chip, wherein otherwise, the reconfigurable butterfly unit is in the normal butterfly operation mode; and the verification unit is connected to an output port of the reconfigurable butterfly unit, and the verification unit is configured to: calculate the product of multiplying the first verification value by a predetermined coefficient, calculate a difference value between the product and the second verification value, determine whether the difference value is less than or equal to a verification threshold, and if yes, determine that the output data is accurate.

2. The verification system for an operation result based on a reconfigurable butterfly unit according to claim I, wherein the input data and the output data are both arrays.

3. The verification system for an operation result based on a reconfigurable butterfly unit according to claim 2, wherein a transformation matrix of the input data satisfies a calculation formula:

$$W \cdot W^T = kE,$$

in the formula, W is the transformation matrix of the input data, E is an identity matrix, and k is a constant.

4. The verification system for an operation result based on a reconfigurable butterfly unit according to claim 1, wherein when the DSP chip is in the data reception phase, the reconfigurable butterfly unit is reconfigured into a first square sum calculation unit, to: calculate a square sum of the input data, label the calculated square sum as the first verification value, and transmit the first verification value to the verification unit for temporary storage.

5. The verification system for an operation result based on a reconfigurable butterfly unit according to claim 4, wherein a transformation matrix of the input data satisfies a calculation formula:

$$W \cdot W^T = kE,$$

in the formula, W is the transformation matrix of the input data, E is an identity matrix, and k is a constant.

6. The verification system for an operation result based on a reconfigurable butterfly unit according to claim 4, wherein when the DSP chip is in the data transmission phase, the reconfigurable butterfly unit is reconfigured into a second square sum calculation unit, to: calculate a square sum of the output data, label the calculated square sum as the second verification value, and transmit the second verification value to the verification unit.

7. The verification system for an operation result based on a reconfigurable butterfly unit according to claim 6, wherein a transformation matrix of the input data satisfies a calculation formula:

$$W \cdot W^T = kE,$$

in the formula, W is the transformation matrix of the input data, E is an identity matrix, and k is a constant.

8. The verification system for an operation result based on a reconfigurable butterfly unit according to claim 6, wherein the first square sum calculation unit comprises a plurality of square units and accumulate units, and the second square sum calculation unit have the same structure as the first square sum calculation unit.

9. The verification system for an operation result based on a reconfigurable butterfly unit according to claim 8, wherein a transformation matrix of the input data satisfies a calculation formula:

$$W \cdot W^T = kE,$$

in the formula, W is the transformation matrix of the input data, E is an identity matrix, and k is a constant.

10. The verification system for an operation result based on a reconfigurable butterfly unit according to claim 8, wherein when the reconfigurable butterfly unit performs a discrete Fourier transform (DFT) operation and an inverse DFT (IDFT) operation, the square unit comprises: first multipliers, second multipliers, and adders;

the first multipliers are configured to calculate the squares of the real parts of each input data;

the second multipliers are configured to calculate the squares of the imaginary parts of each input data; and the adders are configured to: calculate a sum value of the squares of the real parts and the squares of the imaginary parts, and label the sum value as an output of the square unit.

11. The verification system for an operation result based on a reconfigurable butterfly unit according to claim 10, wherein a transformation matrix of the input data satisfies a calculation formula:

$$W \cdot W^T = kE,$$

in the formula, W is the transformation matrix of the input data, E is an identity matrix, and k is a constant.

12. The verification system for an operation result based on a reconfigurable butterfly unit according to claim 1, wherein when the reconfigurable butterfly unit performs a discrete Fourier transform (DFT) operation and an inverse DFT (IDFT) operation, the predetermined coefficient is a score, and the score is determined by a quantity of pieces of data required when the reconfigurable butterfly unit performs one operation.

13. The verification system for an operation result based on a reconfigurable butterfly unit according to claim 1, wherein a transfonuation matrix of the input data satisfies a calculation formula:

$$W \cdot W^T = kE,$$

in the formula, W is the transformation matrix of the input data, E is an identity matrix, and k is a constant.

14. A verification method for an operation result based on a reconfigurable butterfly unit, the method being used for performing data verification on a digital signal processing (DSP) chip, the DSP chip comprising a reconfigurable butterfly unit, wherein the reconfigurable butterfly unit has a normal butterfly mode and is capable of being reconfigured into two modes: a first verification mode and a. second verification mode, and the method comprises:

receiving and storing an input in the input data of the DSP chip;

acquiring status information of the DSP chip;

sending a reconfiguration operation instruction to the reconfigurable butterfly unit, so that: when the DSP chip is in a data reception phase, control the reconfigurable butterfly unit to be reconfigured into the first verification mode, to calculate a first verification value based on the input data of the DSP chip, and when the DSP chip is in a data transmission phase, control the reconfigurable butterfly unit to be reconfigured into the second verification mode, to calculate a second verification value based on output data of the DSP chip, otherwise, the reconfigurable butterfly unit does not perform reconfiguration; and calculating the product of multiplying the first verification value by a predetermined coefficient, calculating a difference value between the product and the second verification value. determining whether the difference value is less than or equal to a verification threshold, and if yes, determining that the output data is accurate.

* * * * *